United States Patent [19]

Schamblin

[11] 3,791,337

[45] Feb. 12, 1974

[54] SIGNALING DEVICE

[76] Inventor: Charles H. Schamblin, 1714 South M St., Bakersfield, Calif. 93302

[22] Filed: Feb. 26, 1973

[21] Appl. No.: 335,658

[52] U.S. Cl. ........ 116/28 R, 40/129 C, 280/154.5 R
[51] Int. Cl. .................................................. B60q
[58] Field of Search......24/81 BA, 243 AB, 243 D, 24/263, 263 LS; 40/128, 129 C, 133 R; 116/28 R, 28 A, 30, 35, 63, 63 P, 114, 116/173; 248/40, 42, 206; 280/150, 152, 280/153, 154, 154.5; 317/2 D

[56] References Cited
UNITED STATES PATENTS

| 2,318,340 | 5/1943 | Thacher et al. ..................... 317/2 D |
| 2,464,365 | 3/1949 | Aves .................................. 116/28 A |
| 2,585,397 | 2/1952 | McCollum, Jr. et al. ..... 280/154.5 R |
| 2,646,240 | 7/1953 | Anderson ........................... 248/42 X |
| 2,993,465 | 7/1961 | Ginsley et al. ..................... 116/63 P |
| 3,241,857 | 3/1966 | Goetz ............................. 280/154.5 R |
| 3,255,725 | 6/1966 | Von Kriedner et al. ....... 40/133 R X |
| 3,582,108 | 6/1971 | Carlton ......................... 280/154.5 R |
| 3,590,768 | 7/1971 | Shanok ............................. 116/28 R |
| 3,678,886 | 7/1972 | Tibbet ................................ 116/173 |

FOREIGN PATENTS OR APPLICATIONS 1,215,604  11/1959  France ............................. 116/28 R Primary Examiner—Louis J. Capozi
Attorney, Agent or Firm—Huebner & Worrel

[57] ABSTRACT

A signaling device for a vehicle having a flexible envelope with transparent walls, a sheet of luminous material housed within the envelope in registry with the walls, and a bracket for fastening the envelope on a vehicle in a position to be fluttered by movement through the air.

1 Claim, 4 Drawing Figures

PATENTED FEB 12 1974 3,791,337

SIGNALING DEVICE

BACKGROUND OF THE INVENTION

The present invention relates to a signaling device and more particularly to such a device which is adapted to be attached to a vehicle in a position of visual prominence and to be fluttered by movement through the air so as to attract attention to the position and relative movement of the vehicle.

The prior art patents such as the Quinn U.S. Pat. No. 1,859,599; Challoner U.S. Pat. No. 2,166,520; Thacher et al. U.S. Pat. No. 2,318,340; MacLea U.S. Pat. No. 3,024,552; Von Kreidner et al. U.S. Pat. No. 3,255,725; Dirks et al. U.S. Pat. No. 3,276,416; Gualano U.S. Pat. No. 3,540,685; Gualano U.S. Pat. No. 3,653,902; and Tibbet U.S. Pat. No. 3,678,886 relate primarily to warning flags for vehicles. The devices of these patents typify prior art warning flags over which the present invention constitutes an improvement.

It has long been known that one of the major causes of vehicular collisions is the inattentiveness of one or more of the operators of the vehicles involved. One of the most frequently occurring types of such collisions is the rear end collision. This type of collision commonly occurs in heavy traffic where the driver of the following vehicle is inattentive and fails to react to a change in direction or velocity of the vehicle immediately ahead.

A variety of types of devices, such as enlarged taillights, reflective tape, and warning flags such as that disclosed by the prior art, have been employed in an attempt to alleviate this problem. The use of enlarged taillights and reflective tape has been somewhat less than satisfactory since they frequently have the effect of hypnotizing the operator of the following vehicle or causing preoccupation with their rythmic effect. Conventional warning flags have also been deficient in that, while they provide rapid movement during use which assists in attracting the attention of the operator of a following vehicle, their brilliance is rapidly tarnished with use by moisture, dirt, exhause residue, road oil and the like. Thus, while motion is provided with such warning flags, their visual prominence is rapidly reduced during use so that they are soon of little value in attracting the attention of the operator of a following vehicle.

Therefore, it has long been recognized as desirable to have a signaling device which automatically provides attention attracting motion during use while resisting tarnishing by deleterious materials so as to preserve its visual prominence.

SUMMARY OF THE INVENTION

In view of the foregoing, it is an object of the present invention to provide an improved signaling device for use on all types of vehicles.

Another object is to provide such a device which is specifically adapted for use on automotive vehicles to reduce the danger of collisions and particularly rear end collisions.

Another object is to provide such a device which has a luminous sheet of material which flutters during movement of the vehicle so as to attract attention.

Another object is to provide such a device which resists tarnishing by deleterious or contaminating materials.

Another object is to provide such a device which preserves its visual prominence over long periods of use.

Another object is to provide such a device which can readily be cleaned to remove deleterious or contaminating materials without damaging its luminous characteristics.

Another object is to provide such a device which permits replacement of the luminous sheet of material.

A further object is to provide such a device which resists wear during use.

Still further objects and advantages are to provide improved elements and arrangements thereof in a device for the purposes described which is dependable, economical, durable and fully effective in accomplishing its intended purposes.

DESCRIPTION OF THE PREFERRED EMBODIMENT

Figure 1:
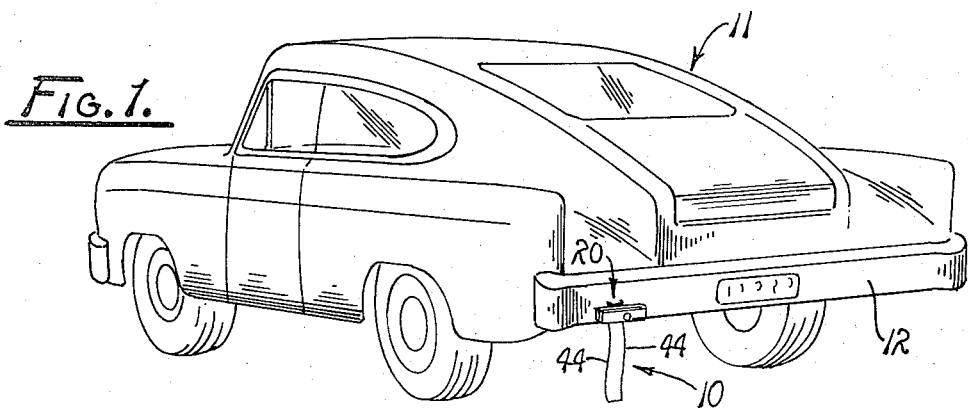
FIG. 1 is a perspective view of the signaling device of the present invention mounted on the rear bumper of an automotive vehicle.

Referring more particularly to the drawing, the signaling device of the present invention is generally indicated by the numeral 10 in FIG. 1 mounted on an automotive vehicle 11. The automotive vehicle has a rear bumper 12 with a continuous, right-angularly bent lower flange 13. As will subsequently become more clearly apparent, the signaling device is adapted to be mounted at any convenient location on an automotive or similar vehicle. However, the device is believed to be most advantageously deployed at the rear of an automotive vehicle, as will subsequently be more fully explained.

Figure 2:
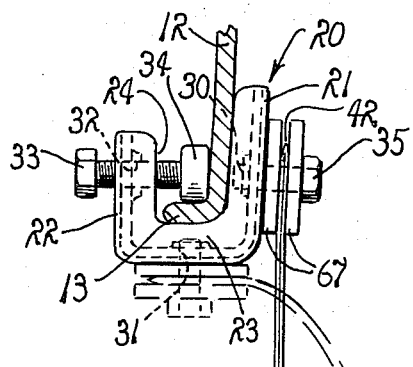
FIG. 2 is a somewhat enlarged side elevation of the signaling device mounted on bumper shown in cross section.
Figure 3:
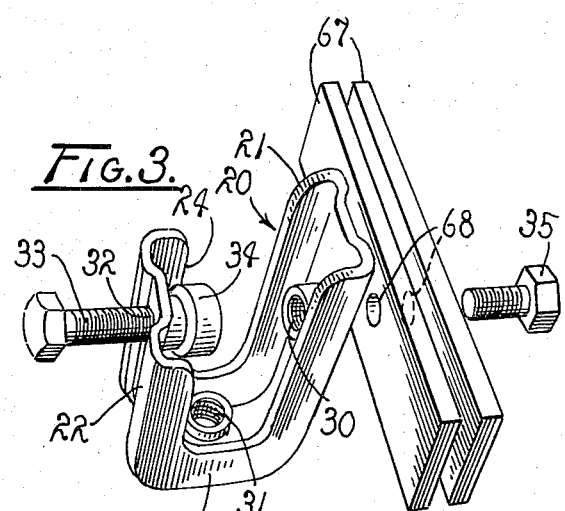
FIG. 3 is an exploded view of a vehicle attachment bracket of the device.
Figure 4:
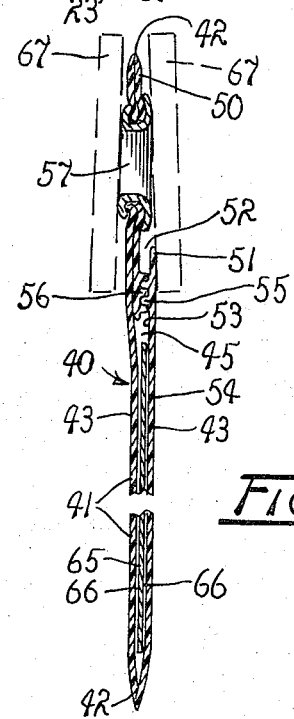
FIG. 4 is a fragmentary cross section of a warning flag of the device.

The signaling device 10 has a vehicle attachment bracket 20 constructed of any suitable material such as plastic, or any of a wide variety of metallic and non-metallic materials. The bracket is substantially U-shaped in side elevation, as shown in FIG. 2, having an envelope mounting portion 21, a somewhat shorter substantially parallel bolt adjusting portion 22 and a continuous connecting portion 23 extending substantially normal to portions 21 and 22. The portions 21, 22 and 23 bound a slot 24 of dimensions sufficient to receive the lower flange 13 of the rear bumper 12. Each of the portions 21, 22 and 23 is longitudinally corrugated to enhance the structural rigidity thereof.

The envelope mounting portion 21 of the bracket 20 has a screw threaded bore 30 extending therethrough approximately centrally thereof. The connecting portion 23 of the bracket has a screw threaded bore 31 extending therethrough. The bolt adjusting portion 22 of the attachment bracket has a screw threaded bore 32 extending therethrough defining an axis substantially normal thereto. An adjustment bolt 33 is screw threadably received in bore 32 and affords a resilient stop 34 at the end thereof within the slot 24 of the bracket. The bolt permits screw threaded adjustment of the stop to and from the envelope mounting portion of the bracket. A flag mounting bolt 35 is preferably screw threadably received in the bore 30 of the mounting portion 21. Alternatively, the flag mounting bolt can be screw threadably received in the bore 31 of the connecting portion 23 of the bracket, as will subsequently be described.

A warning flag is generally indicated by the numeral 40 in FIG. 2. The warning flag has an elongated, substantially rectangular container or envelope 41 having opposite ends 42. The envelope is preferably constructed of a pair of flexible, transparent plastic walls or panels 43 having peripheral edges 44. The corresponding peripheral edges of the panels are bonded or sealed together so as to form an internal compartment 45 for the envelope. So constructed, the envelope is substantially impervious to moisture.

One of the panels 43, affixed to the other panel as described, has an end segment 50 mounted on the opposite panel immediately adjacent to the opposite end of the envelope and a main segment 51 mounted on the opposite panel extending the remainder of the length of the envelope. The main segment overlaps the end segment of the panel to define a transversely extending mouth 52 for the envelope. The segments have inner surfaces 53 and outer surfaces 54. The inner surface of the main segment overlapping the end segment has a corrugated or tongue-and-groove fastener 55 extending the entire length of the mouth. The outer surface of the end segment which is overlapped by the main segment has a similarly corrugated or tongue-and-groove fastener 56 which is adapted to be positioned in mated, fluid tight engagement with fastener 55 of the main segment. A grommet 57 is mounted in the end segment 50 and the opposite panel 43 between the opposite end 42 of the envelope 41 and the mouth 52 so as to define a bolt hole 58 for the envelope.

A sheet of luminous material 65 is removably received in the compartment 45 of the envelope 41. The sheet is preferably of a length slightly shorter than that of the main segment 51 of panel 43 so that it can readily be deposited in the envelope and the fasteners 55 and 56 engaged without difficulty. The sheet has opposite surfaces 66 which are of a bright, fluorescent and/or reflective nature so as to be luminous and have a high degree of visual prominence. A pair of wear plates 67, preferably constructed of plastic or a similar wear resistant material, have corresponding boreholes 68 extending centrally therethrough. With the signaling device 10 assembled, as shown in FIG. 2, the flag mounting bolt extends through boreholes 68 of the plates, the borehole 58 of the warning flag 40 and is tightened into the bore 30 of the mounting portion 21 of the bracket 20. Thus, the opposite end 42 of the warning flag is compressibly retained between the wear plates. As shown in FIG. 2, the wear plates compressibly enclose the mouth 52 when the device is assembled as described thus reinforcing the fluid tight condition of the engaged tongue-and-groove fasteners 55 and 56.

OPERATION

The operation of the described embodiment of the subject invention is believed to be clearly apparent and is briefly summarized at this point. As previously noted, the signaling device 10 of the present invention is intended to be mounted at any suitable location on any type of vehicle in order to attract attention to the location and relative motion of the vehicle. However, the device is specifically adapted to be mounted on the rear bumper 12 of an automotive vehicle 11. Thus, as shown in FIG. 2, the lower flange 13 of the rear bumper is received in the slot 24 of the bracket 20. The adjustment bolt 33 is screw threadably adjusted in the bore 32 to position the stop 34 in abutment against the bumper above the flange. The adjustment bolt is tightened to secure the flange between the stop and the connecting portion 23 of the bracket.

With the signaling device 10 secured on the rear bumper 12 of the automotive vehicle 11, as described, motion of the vehicle causes the warning flag 40 to be fluttered in the air currents produced thereby. Such a fluttering motion causes the sheet of luminous material 65 contained therein to reflect light to attract the attention of operators of vehicles in the vicinity. This fluttering motion has been found to overcome the previously referred to hypnotizing effect of automobile taillights and reflective tape and therefore assist in preventing collisions and particularly rear end collisions.

Since, as previously described, the envelope 41 is substantially impervious to moisture, the sheet of luminous material 65 is protected from being tarnished or damaged by such deleterious materials as water, motor oil, exhaust residue, road oil and the like. The materials which do collect on the outside of the envelope can readily be removed therefrom using a sponge or similar device so as to insure the transparency of the panels 43. The wear plates 67 which compressibly retain an opposite end 42 of the envelope therebetween protect the envelope from wear by cushioning the envelope against abrasive contact with the bracket or bumper and reducing movement of the engaged opposite end. Similarly the wear plates insure that the fluttering motion of the envelope does not tear or otherwise damage the envelope during such use. Thus, a long operational life for the warning flag 40 is insured.

The existence of the mouth 52 in the envelope 41 permits the sheet of luminous material 65 contained therein to be removed from the envelope so as to permit the substitution of sheets of luminous material of a variety of appearances and constructions as well as to permit replacement where the sheet in use inadvertently becomes damaged. The tongue-and-groove fasteners 55 and 56 can be resealed so as to insure that moisture cannot thereafter gain admission to the compartment 45 of the envelope. As previously noted the warning flag 40 can alternatively be mounted on the connecting portion 23 of the bracket 20, as shown in dashed lines in FIG. 2, with the flag mounting bolt 35 received in the screw threaded bore 31 thereof as previously described.

Therefore, the signaling device of the present invention assists in preventing collisions and particularly rear end collisions by utilizing the air currents produced by the automobile on which it is mounted to create a fluttering motion to attract attention while insuring that the sheet of luminous material contained therein is protected from damage by deleterious materials.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A visually detectable signaling device adapted to be attached to the bumpers of automobiles and the like and flutter in air currents for attracting attention of motorists comprising:

A. a flexible envelope including a pair of flexible, substantially transparent panels arranged in substantial face-to-face relation and joined together by means defining a discontinuous seal extended along selected portions of the periphery of said panels for forming between the panels a compartment having an open mouth;

B. a flexible luminescent sheet disposed within the compartment;

C. means for sealing said open mouth including a tongue-and-groove fastener extended across the mouth between the adjacent ends of said seal; and D. means for releasibly suspending said envelope from a selected rear bumper of an automobile including a bracket of a substantially U-shaped configuration having a pair of legs for receiving a portion of the bumper between the legs thereof and including means defining a threaded bore extended through one leg of the pair of legs, means including a screw-threaded mounting bolt threadedly extended through said screw-threaded bore in said one leg for clamping said bracket to said bumper, and means for attaching said envelope to said bracket including at least one wear plate.

* * * * *